(12) United States Patent
Moldt et al.

(10) Patent No.: US 7,392,988 B2
(45) Date of Patent: Jul. 1, 2008

(54) ROTARY SEAL

(75) Inventors: David T. Moldt, Lake Jackson, TX (US);
James E. Taylor, Brazoria, TX (US);
Sina Saylany, The Woodlands, TX (US)

(73) Assignee: Equistar Chemicals, LP, Houston, TX (US)

( * ) Notice: Subject to any disclaimer, the term of this patent is extended or adjusted under 35 U.S.C. 154(b) by 190 days.

(21) Appl. No.: 11/478,046

(22) Filed: Jun. 29, 2006

(65) Prior Publication Data
US 2008/0018055 A1    Jan. 24, 2008

(51) Int. Cl.
*F16J 15/40* (2006.01)
*F16D 11/04* (2006.01)
*F04C 19/00* (2006.01)

(52) U.S. Cl. .................... 277/429; 277/431; 277/432; 417/68

(58) Field of Classification Search ......... 277/429–432; 417/68
See application file for complete search history.

(56) References Cited

U.S. PATENT DOCUMENTS

| 2,487,177 | A | * | 11/1949 | Pollack | 277/429 |
| 2,554,234 | A | | 5/1951 | Baudry et al. | 286/9 |
| 3,734,580 | A | * | 5/1973 | Piscitelli | 384/131 |
| 4,471,963 | A | * | 9/1984 | Airhart | 277/301 |
| 5,015,000 | A | * | 5/1991 | Perini | 277/422 |
| 5,090,711 | A | * | 2/1992 | Becker | 277/429 |
| 5,246,155 | A | * | 9/1993 | Barrois | 226/190 |

FOREIGN PATENT DOCUMENTS

WO    PCT/US2007/013362    11/2007

* cited by examiner

*Primary Examiner*—Vishal Patel
(74) *Attorney, Agent, or Firm*—Roderick W. MacDonald

(57) ABSTRACT

A rotary seal housing having opposing ends, a first fluid conducting slot at one of the opposing ends, a pair of spaced apart fluid conducting slots at the other opposing end, and sets of apertures connecting the first fluid conducting slot with the pair of fluid conducting slots, the housing having helical push back grooves that are arcuate in cross-section.

9 Claims, 7 Drawing Sheets

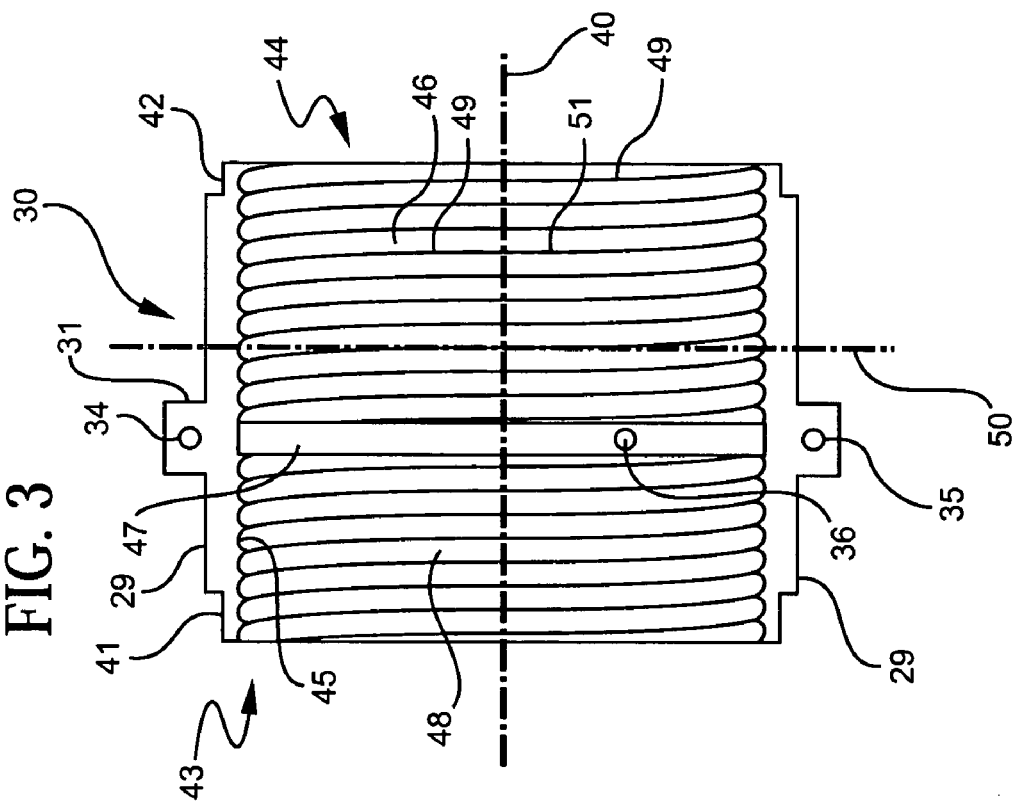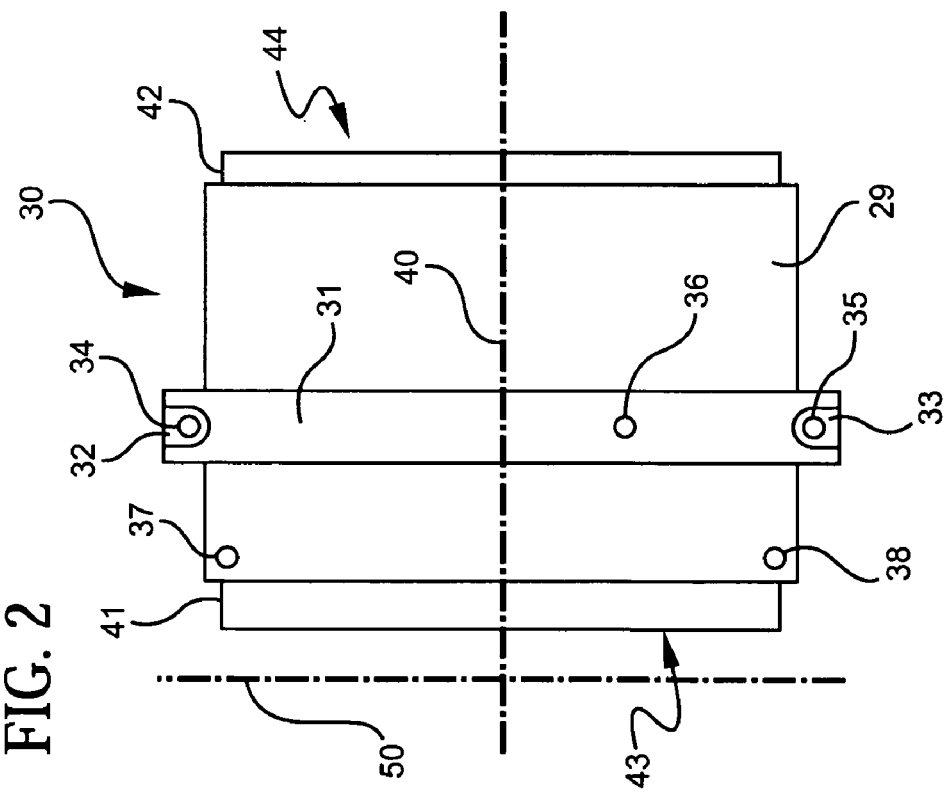

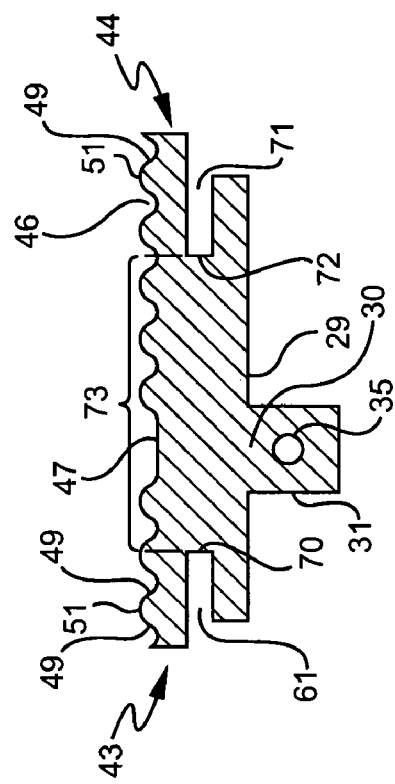
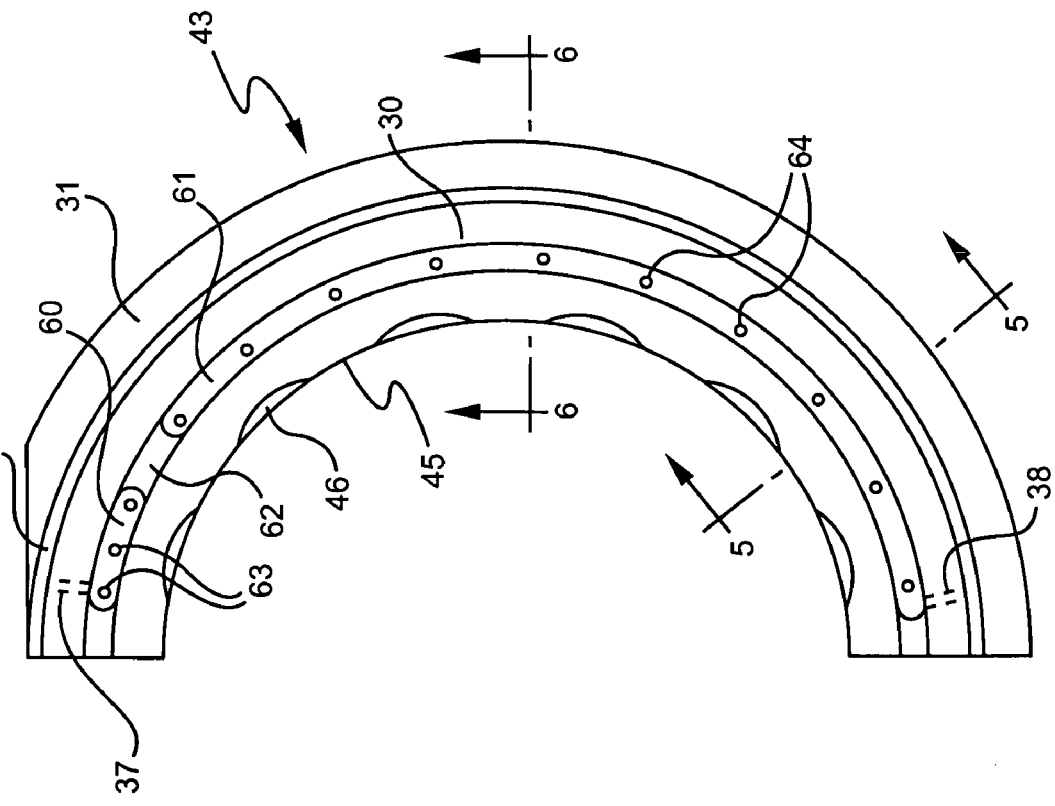
FIG. 4
FIG. 5

ROTARY SEAL

BACKGROUND OF THE INVENTION

This invention relates to seals for rotor sealing systems, particularly seals for machines that manipulate a hot, viscous material.

DESCRIPTION OF THE PRIOR ART

SUMMARY OF THE INVENTION

Heretofore machines for processing a viscous fluid such as molten polymer blenders employed seals with wind back grooves, explained in detail hereinafter, on a rotating shaft which was carried inside a smooth, stationary housing. These push back grooves were essentially right angular (square or rectangular) in transverse cross-section, and were designed to push back into the mixing apparatus, any polymer that, on the process end of the seal, managed to squeeze into the clearance between the rotating shaft and the stationary housing, and move away from the process end (interior of the apparatus) of the seal toward the atmosphere end (exterior of the apparatus) of that same seal. Sometimes this fugitive polymer can overcome the push back effect of the wind back grooves, travel the length of the seal, and escape into the ambient atmosphere outside the apparatus in an uncontrolled manner.

This prior art rotary seal has no mechanical provision for collecting fugitive polymer and removing same to the ambient atmosphere in a controlled manner. This prior art seal also had provision for only limited, very localized fluid cooling on the atmosphere end of its housing, and no provision for controlled cooling over the remainder of the housing up to and including the process end of that seal. For example, a conventional prior art seal would carry at its atmosphere end, a pair of tubes internal to the housing, the tubes being joined in fluid communication at one end thereof, and being open at their opposing, atmosphere ends so that cooling liquid could be introduced from the atmosphere into one such end, pass through the pair of tubes and their conjoined ends, and back out to the atmosphere by way of the other such end. A U-tube cooling arrangement in the atmosphere end of a prior art seal, as just described, would typically cool the first two inches of a seven inch long (atmosphere end to process end) seal housing, thereby leaving the large majority of the housing with no provision for controlled cooling. Thus, this prior art arrangement exhibited a steep and uneven (non-uniform) temperature gradient from its process end to its atmosphere end.

Thus, the prior art provided controlled cooling for only stationary housings, and then only for a minor length of such housings that was furthest from the process end of the seal housing.

This same prior art employed only essentially right angular transverse cross-sectioned push back grooves which tended to trap and hold fugitive polymer in its sharp, right angled corners until the trapped polymer was essentially baked solid due to the total absence of a controlled cooling capability over the majority of the length of the housing, particularly in the length of the housing closest to the hot process end of the seal.

Finally, what fugitive polymer that was not trapped and baked to a solid was not caught and removed to the atmosphere in a controlled and an environmentally acceptable manner.

This invention provides improvement in all the foregoing areas of deficiency in the prior art.

In accordance with this invention there is provided a seal housing that has a body with opposing ends, the body carrying provision for controlled cooling over essentially the full length of the body comprising at one end a first slot and at the other end spaced apart second and third slots, the first slot being in fluid communication with the second and third slots by way of a plurality of spaced apart apertures so that fluid that passes into the third slot fills that slot and then, by way of certain of the apertures, fills the first slot before reaching, by way of certain other apertures, the second slot for exiting from the housing.

The body also carries wind back grooves that are essentially curvilinear in their transverse cross-section, and which are interrupted by an annular accumulation groove and leakage port for catching and removing fugitive material.

BRIEF DESCRIPTION OF THE DRAWINGS

FIG. 2 shows an external plan view of a seal segment within this invention.

FIG. 3 shows an internal plan view of the segment of FIG. 1.

FIG. 4 shows an end view of the atmosphere end of the segment of FIG. 1.

FIG. 5 shows a section through one location of the end view of FIG. 4.

DETAILED DESCRIPTION OF THE INVENTION

For sake of brevity and clarity, this invention will be described in the context of apparatus for the mixing and/or extruding of hot, viscous polymeric materials. However, this invention is not so limited, it being applicable to any situation that requires dynamic sealing of a hot, viscous material.

This invention will also, for sake of brevity and clarity, be described in terms of using a coolant fluid to cool the housing, but this invention is not limited to coolant fluids, other types of fluids being useful as well.

Therefore, this invention provides a seal housing with an arrangement (combination) of internal first, second, and third transverse slots with interconnecting apertures which will, for example, cool essentially the entire length of the housing in such a controlled manner that the temperature gradient in the longitudinal length of the housing is essentially uniform from the process side of the seal that is inside the apparatus (machine) to the ambient atmosphere (atmosphere) side that is outside the machine. By the use of this invention, and contrary to the prior art described hereinabove, the temperature gradient in the housing during operation does not vary substantially around the transverse circumference of that housing at any specific location along the longitudinal axis of that housing. This results in essentially uniform heat flow and heat extraction in essentially all parts of the seal housing, and consistent maintenance of such heat flow and extraction from the seal housing during the useful life of the seal.

Figure 1:
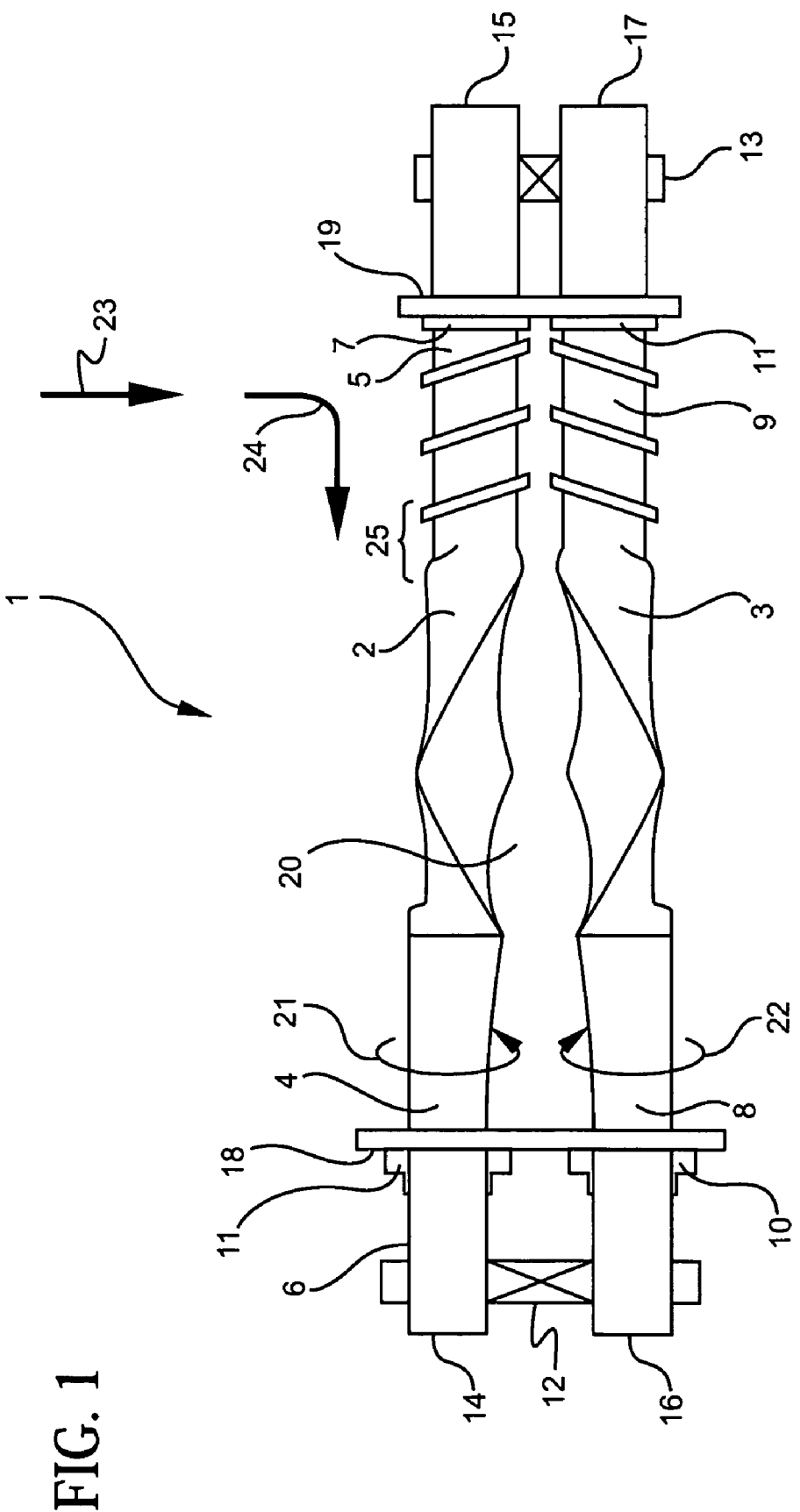
FIG. 1 shows an arrangement of rollers in a commercial polymer mixing/extruding machine, and the location in that machine where this invention can be employed.

FIG. 1 shows a pair of opposed rollers 2 and 3 as conventionally employed inside a commercial polymer mixing/extruding machine 1. This figure shows upper roller 2 to have rotor ends 4 and 5 that extend into seals 6 and 7, respectively, as shown in greater detail here in after. Similarly, lower roller 3 has rotor ends 8 and 9 that extend into lower seals 10 and 11. Rollers 2 and 3 are supported in a rotating manner by conventional bearing sets 12 and 13. Plates 18 and 19 represent the outer shell of machine 1, and the demarcation line between the process (inner) side and atmosphere (outer) side thereof. Ends 4, 5, 8, and 9 of seals 6, 7, 10, and 11, respectively, are, therefore, termed process ends because they are in or immediately adjacent to the interior of machine 1, and are exposed to either un-melted polymer powder or molten polymer under an elevated pressure, i.e., where the actual processing of hot, viscous polymer material is carried out. Outer ends 14, 15, 16, and 17 are termed atmosphere ends because they are in the atmosphere outside machine 1.

In operation, a polymer powder represented by arrows 23 and 24 is passed, as shown by those arrows, toward space 20 between rollers 2 and 3 for the purpose of melting such powder in a conventional manner well known in the art. Upper roller 2 is rotated in a counter clockwise manner as shown by arrow 21, while lower roller 3 is rotated in a clockwise motion as shown by arrow 22, the polymer traveling into space 20 and away from the reader.

Seals 7 and 11 are conventional powder seals known in the art since they only see low temperature (un-melted), ambient (low) pressure polymer powder 23 and 24 during polymer processing in the machine. The powder melts in area 25 of the machine. Thus, seals 10 and 11, during operation of apparatus 1, see molten polymer under elevated pressure, e.g., 40 psig, and these are the seals to which this invention is directed.

Seals 10 and 11 employ internal helical grooves which will be explained in detail here in after in respect of FIGS. 3, 5, 6, and 9. However, while viewing FIG. 1 it is helpful to note that upper seal 11, pursuant to this invention, will employ a left handed helix groove (thread) orientation, while lower, opposing seal 10 will employ a right handed groove (thread) orientation. This way, seals 10 and 11 cooperate with one another to push fugitive molten polymer that reaches them away from plate 18 and back toward interior 20.

Although the seal housing of this invention could be employed as a one-piece (unitary), monolithic housing member, it more likely, for sake of mechanical convenience, will be practiced in the form of segmented members that are joined together to form the final housing. Thus, the final seal housing of this invention can be employed in either a unitary or segmented form.

Figure 8:
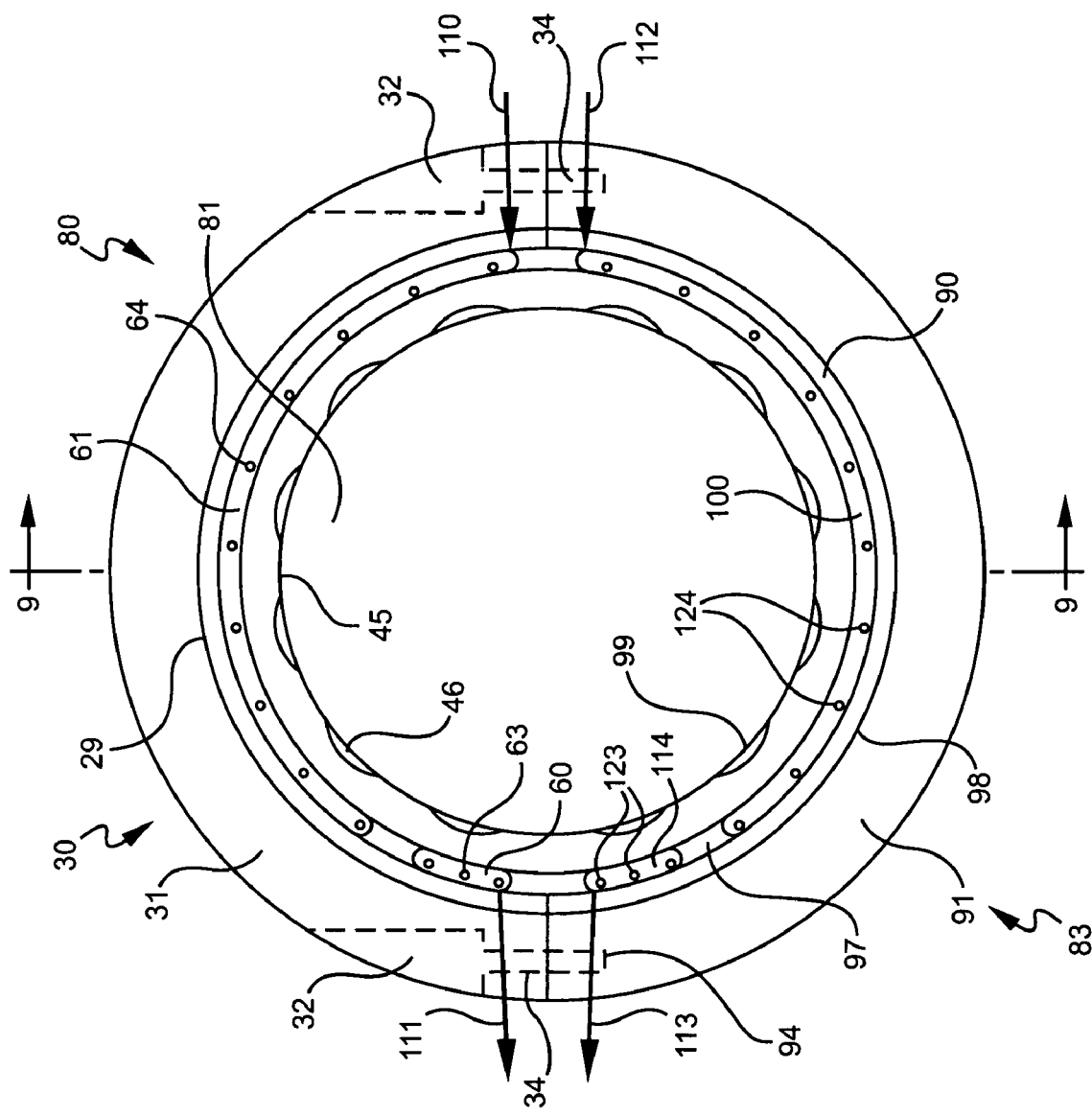
FIG. 8 shows two segments of the type of FIG. 1 when mated together to form a final seal.
Figure 9:
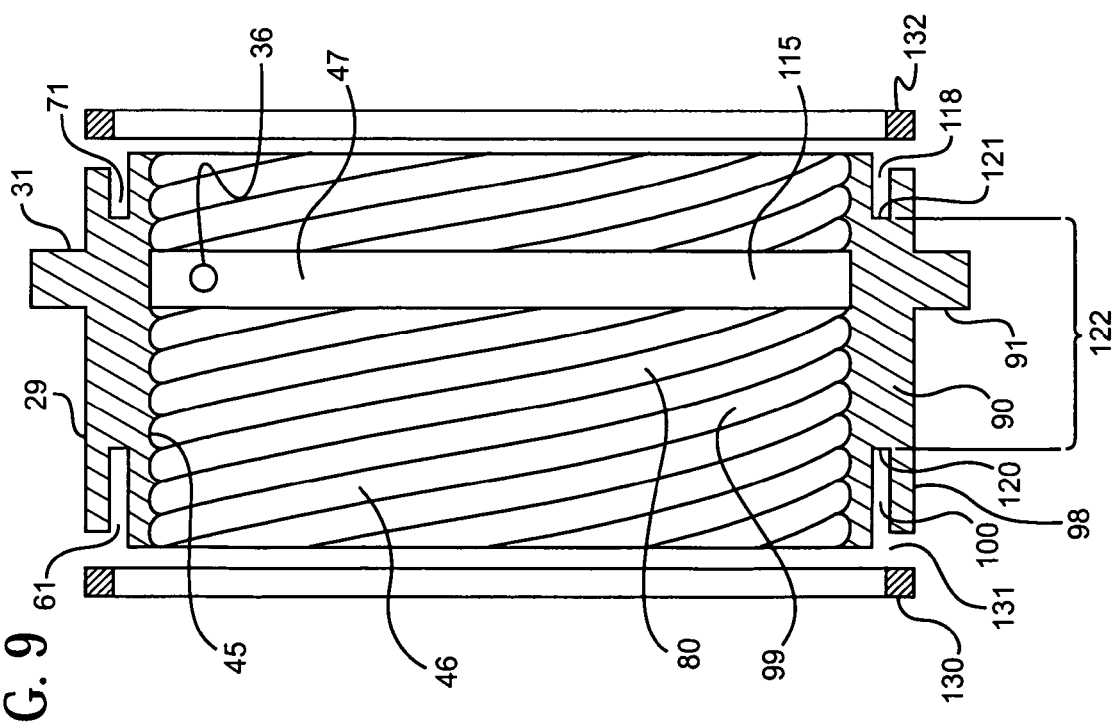
FIG. 9 shows a vertical cross-section of the final seal of FIG. 8.

When multiple (at least two) segments are assembled or otherwise joined, they will form the desired final housing configuration that will receive a rotor end 4, 5, 8, or 9 (FIGS. 8 and 9).

In the context of a unitary housing, a single set of first, second, and third transversely oriented slots together with communicating apertures could be employed in the housing. Alternatively, multiple sets of such slots and communicating apertures could be employed.

When the seal housing is segmented (FIGS. 2-7), each segment of the housing could contain first, second, and third transverse slots together with communicating apertures that comprise this invention. Thus, at least two of such segments are joined together to form the final seal housing, that final housing will contain multiple (at least two) sets of first, second, and third transverse slots with accompanying apertures.

Accordingly, this invention, for sake of clarity and brevity, will be described in terms of an individual seal segment (FIGS. 2-7) and the joining of two such segments to form a final seal housing assembly within this invention (FIGS. 8, 9, and 11), although this invention is not so limited.

FIG. 2 shows the outside surface 29 of a hemispherical seal segment of this invention which surface represents body 30 which constitutes a first segment (half) of the desired seal housing. Body 30 has an axis 40 which is termed the longitudinal (long) axis of the housing, and a complimentary transverse axis 50 which can define a transverse axial plane anywhere along axis 40. Axis 40 is termed a longitudinal axis for sake of convenience only, because axis 40 can, within this invention, be either longer or shorter than transverse axis 50 depending on the specifics of the particular application of this invention.

Body 30 carries a flange 31 completely (fully) around its outer circumference. Flange 31 has milled openings 32 and 33 and bolt holes 34 and 35 to receive standard bolts and standoffs (FIG. 11) for joining body 30 to a similar segment (FIG. 8) to produce the desired final seal housing of this invention. Flange 31 has a port 36 that extends through that flange and body 30 to the interior surface 48 (FIG. 3) of body 30 to provide fluid communication through the body and flange from the interior of the body to the exterior of that body. Body 30 also has ports 37 and 38 which, like port 36, extend there through from its exterior surface 29 to its interior surface 45 (FIG. 3) to provide fluid communication through body 30. Ports 37 and 38 are located at spaced apart positions at a one end of body 3. Notches 41 and 42 are provided around the full circumference of body 3 on opposing ends 43 and 44 of body 30 so that the inner surface 45 (FIG. 3) of body 30 is longer than the outer surface 29 of body 30.

FIG. 3 shows the inner side 45 of the segment of FIG. 2. Inner surface 45 of body 30, in this embodiment, carries a seal member which is composed of a series (plurality) of helical (spiral) grooves 46 that extend around the full interior circumference of body 30.

Although this invention is disclosed in detail with respect to the seal member being carried on the interior of body 30, it is within this invention to carry the seal member on the exterior of body 30 or both inside and outside, depending on the mechanical details of the specific application of this invention. Further, even though this invention is described in detail employing a stationary seal member housing, it can also be applied to rotating seal member housings. A rotating sleeve (FIG. 11) carried by rotor ends 4, 5, 8, or 9 fits within the interior 48 of body 30 to provide the opposing seal surface for the helical seal member made up of grooves 46.

In the case of a seal member composed of helical grooves 46, these grooves extend spirally around and along long axis 40 while continually extending away from a first point (start) on end 43 to a second point at opposing end 44. Thus, the long axis of the helix is essentially parallel with long axis 40. Grooves 46 are arcuate, often circular, in transverse cross-sectional configuration, and are defined by upstanding curvilinear ribs 49, the tops of which ribs are essentially flat lands 51 (FIG. 5). The arcuate cross-section of ribs 49 eliminates the right angular cross-section of the prior art without eliminating the function thereof, and further eliminates sharp angled corners that tend to trap and hold fugitive polymer until it is baked solid. Grooves 46 could also be square, trapezoidal, or the like in cross-section. In the case of molten polymer, a minimum groove 46 surface area is desirable for minimum friction, minimum polymer adhesion and packing, and ease of machining. Whatever the application, minimal total area for all of rib lands 51 is also desired in order to reduce friction and pump back pressure, and to produce an efficient pumping operation.

The pitch of grooves 46 is the distance in the axial direction (axis 40) traveled in one revolution of the rotor sleeve (FIG. 11) in relation to a stationary groove 46. "Pitch" is defined by the diameter of the seal bore, the radius of the arcuate cross-section, the number of starts, e.g., 10, and the total surface area of the flat lands. A suitable pitch is, for example, 5.9 inches. The pitch can be any non-zero value up to 2 (pi)(D) where D is the diameter of the seal. Increasing the pitch increases the shear rate in the axial direction, which is acceptable so long as the combined shear rate does not exceed the melt fracture limit of the viscous liquid.

Increasing the area of the flat lands, as well as reducing the radial clearance between the land and the sleeve surface, improves the sealing aspect of the seal, but with the consequence of increasing the shear rate and power dissipated in the seal. Reducing the land area results in a thinner rib, and is limited ultimately by the strength of the material used to manufacture the seal member. There are axial forces which must be resisted by the rib, and once it becomes too thin, the forces can yield the rib and change the geometry of the cross section.

The radius of the arcuate cross-section is established after the pitch limit and maximum land area for a particular combination of diameter, rotation speed, and number of starts is set. The theta angle of the arc will never be more than pi radians, as a larger value will create a 'c' shape which would tend to promote viscous fluid, e.g., polymer, retention in the groove, while increasing the land width.

The number and geometry of grooves 46 will, therefore, vary depending on the characteristics of the material being processed in machine 1, the process pressures employed, the speed of operation of machine 1, and other considerations such as the geometric constraints imposed by existing machine design. Thus, the number of groove 46 circumvolutions employed on inner surface 45 can vary considerably, but, in view of the foregoing discussion, can readily be determined by one skilled in the art.

Grooves 46 can be coated with a friction modifying substance such as Nedox SF-2 manufactured by General Magnaplate, Inc., which allows the material being processed in machine 1 to slip along such grooves to enhance the pumping effect and efficiency of the sealing action while maintaining desired characteristics such as thermal conductivity for heat extraction.

Inner surface 45 carries an accumulation groove 47 around its full circumference that intersects port 36. Accumulation groove 47 is intermediate ends 43 and 44, and transverse to long axis 40 and interrupts grooves 46 to catch fugitive polymer traveling from process end 44 to atmosphere end 43. Port 36 is in fluid communication with the interior of groove 47, and the ambient atmosphere external to housing body 30 to provide a means for the controlled removal of fugitive polymer from within body 30 in an environmentally acceptable manner. Accumulation groove 47 can be placed anywhere intermediate ends 43 and 44, depending on the specific application.

Figure 11:
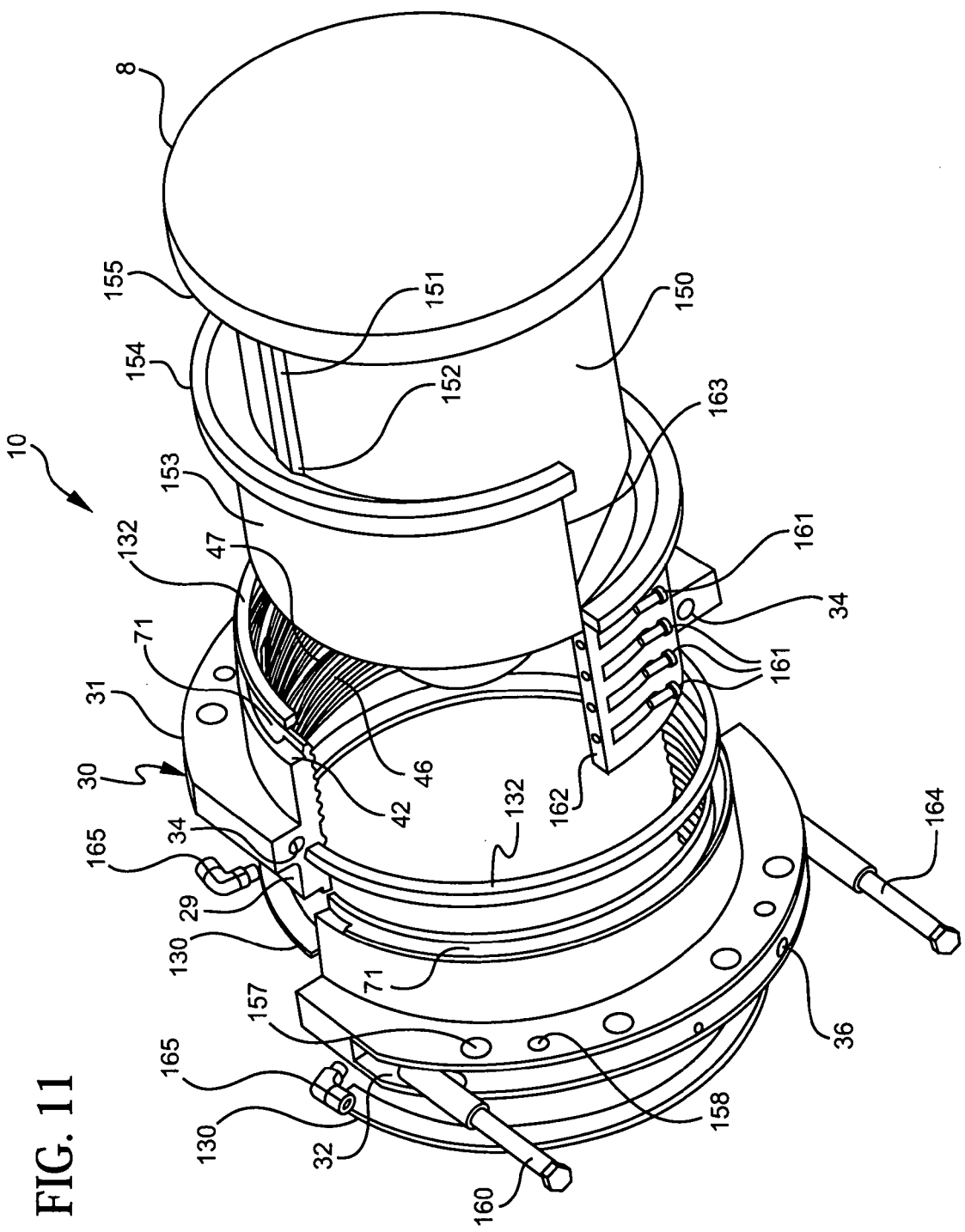
FIG. 11 is an isometric drawing of the final seal of FIG. 8 when mounted in the machine of FIG. 1.

In operation, a polymer mixture being processed is, for example, under an elevated temperature, depending on the composition of the polymer mixture, of from about 350 to about 600 degrees Fahrenheit (F) and a pressure of from about 5 to about 60 psig inside machine 1. Pursuant to such operating conditions, polymer tends to leak into grooves 46 between interior surface 45 and its opposing rotor sleeve (FIG. 11). Lands 51 of grooves 46 are the closest approach of the stationary body 30 to its opposing, rotating rotor sleeve (FIG. 11), and in this area the shear within the polymer is at its highest with the consequence that the heat within the seal housing in this area is also highest. The polymer leaking into grooves 46 in the gap between the seal member formed by grooves 46 and lands 49 on the one hand and the opposing rotor sleeve is pushed back toward the interior of machine 1 where rollers 2 and 3 are located. The location at which leaking polymer is reversed in direction and pushed back toward the interior of machine 1 is termed the "push back frontier" (frontier). The frontier is normally at some point between the process end 44 of body 30 and accumulation groove 47. With normal wear and tear from extended use, this frontier can move closer and closer to accumulation groove 47, and, ultimately, reach that groove. In such a case, polymer moves into groove 47 and out to the exterior of body 30 by way of leakage port 36, at which time it comes to the attention of the operator of machine 1. Thus, in normal operation there is no polymer in groove 47 or port 36.

Figure 7:
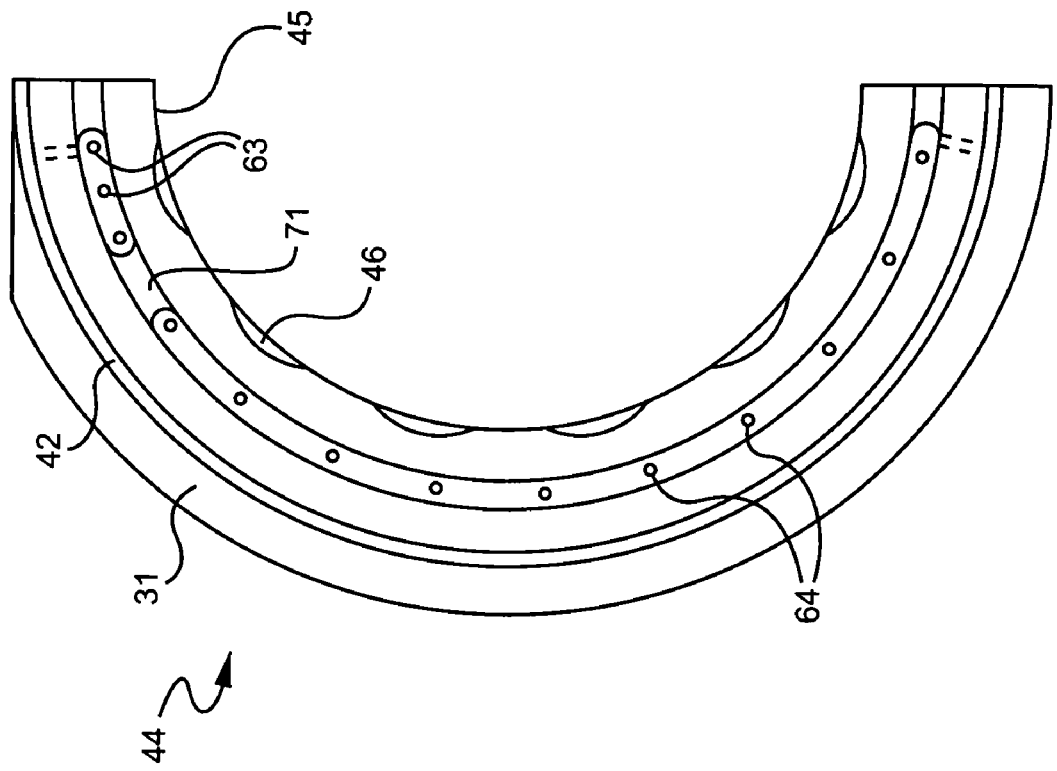
FIG. 7 shows an end view of the process side of the segment of FIG. 1.

Accumulation groove 47 can interrupt grooves 46 anywhere intermediate the longitudinal ends 43 and 44 of body 30, but can be located nearer the atmosphere end 43 than the process end 44 to provide for more sealing surface between the process end and leakage port 36, although this is not a requirement of this invention. For sake of ease of reference in this description flange 31 and groove 47 are located nearer atmosphere end 43. The width of groove 47 can be 10% or less of the length of body 30 along axis 40, and generally will be from about 0.25 to about 2 inches in width. More than one leakage port can be employed, if desired, but too many such ports can sacrifice desired fluid transmitting apertures 63 and 64 (FIGS. 4 and 7).

Figure 6:
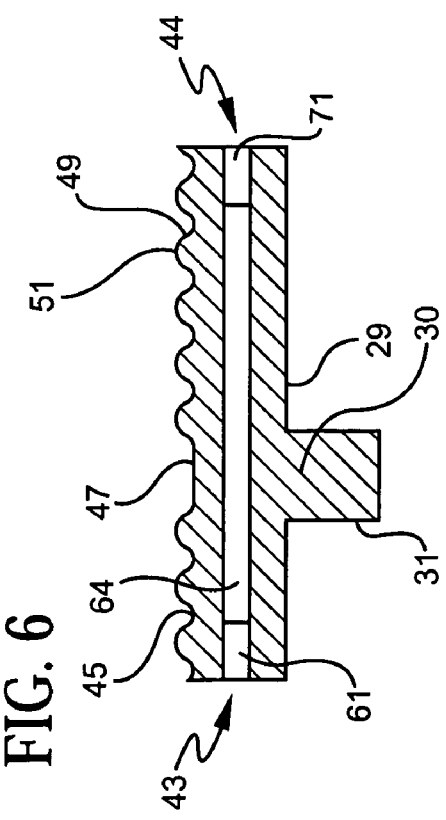
FIG. 6 shows another section through a different location of the end view of FIG. 4.

FIG. 4 shows the atmosphere end 43 of body 30 of FIGS. 2 and 3, and further shows that body 30 has a hemispherical (semi-circular) contour overall in the transverse plane of axis 50 (transverse plane 50). FIG. 4 also shows that body 30 contains two slots 60 and 61 that follow the essentially circular transverse contour of end 43. Slots 60 and 61 are physically separated from one another within body 30, e.g., by way of transverse dividing web 62 so that slots 60 and 61 are not in fluid communication with one another inside body 30 in a transverse manner. Each of slots 60 and 61 are open to sets of a plurality of apertures 63 and 64, respectively. Although these apertures are shown to be of a smaller diameter than the height of the slots, this is for clarity sake only, it being desired that such apertures have an inside dimension approximating, if not equaling, the height of the slots as shown in FIG. 6. This sizing consideration is for the optimization of fluid flow to and from such slots by way of apertures 63 and 64. Transverse slots 60 and 61 extend longitudinally into body 30 (FIG. 5), as well as transversely of body 30 along the transverse, semi-circular contour of end 43. Slot 60 extends over a minor, less than half, portion of the transverse contour length of end 43. Slot 61 extends over a major portion of the remainder of the contour length of side 43 that is not covered by slot 60. In FIG. 4 slots 60 and 61 are shown to cover essentially all the transverse contour length of side 43.

FIG. 5 shows a section A-A taken through body 30, further shows slot 61 extending longitudinally into body 30 a finite distance along axis 40, and finally shows slot 61 ending at its internal end 70. FIG. 5 also shows that there is an opposing slot 71 carried in process end 44 of body 30 which also extends longitudinally into body 30 and terminates at an internal end 72. Thus, it can be seen that opposing slots 61 and 71 have opposing internal ends 70 and 72 that have a section 73 of body 30 there between.

FIG. 6 shows a section B-B taken through body 30 at a different location from FIG. 5, and shows that aperture 64 has a diameter essentially the same as the height of slots 61 and 71. This figure also shows that aperture 64 extends between the internal ends of such slots thereby providing fluid communication between such slots through such aperture.

FIG. 7 shows process end 44 of body 30 of FIGS. 2 and 3, and further shows a corresponding hemispherical contour for end 44 in transverse plane 50. FIG. 7 shows a single slot 71 in body 30 which extends in transverse plane 50 to follow the essentially circular transverse contour of end 44. In contrast to end 43 with its spaced apart slots 60 and 61, slot 71 is not so divided, and extends for essentially the same transverse contour length as the combine slots 60 and 61 plus web 62. Thus, unitary slot 71 is essentially co-extensive in the transverse plane with slots 60 and 61. Accordingly slot 71 is in fluid communication with both sets of apertures 63 and 64, and fluid (FIG. 10) entering into the interior of slot 71 from slot 61 by way of aperture set 64 fills slot 71 until it reaches one or more of apertures 63 whereby fluid begins to travel by way of aperture set 63 back to slot 60. In this manner a fluid such as a coolant can be introduced into the interior of body 30 by way of port 38, fill slot 61, and fill slot 71 to a corresponding level. With the introduction of additional coolant, the remainder of slot 71 corresponding to slot 60 will be filled with coolant, and, by way of aperture set 63, will fill slot 60. Thereafter, coolant exits the interior of body 30 by way of port 37.

Ports 37 and 38 can be located as desired along the length of their respective slots 60 and 61, one desirable combination being that shown in FIGS. 4 and 7. In these figures, circumferentially speaking, port 37 is located at essentially the furthest transverse point away from slot 61, and port 38 is located at essentially the furthest transverse point away from port 37. This provides uniform flow of fluid throughout the interior of body 30 without unduly weakening the housing structure. In the case of the fluid being a coolant, this arrangement of interconnecting slots and aperture sets provides a longitudinal temperature gradient of the seal housing that essentially uniform from process end to atmospheric end of body 30. Further, the temperature gradient does not vary substantially in the transverse plane 50 of body 30 at any given location along axis 40.

FIG. 8 shows two segments like formed like the segment shown in FIGS. 2-7, and joined together to form a single, final seal housing 80 that has an interior volume 81 adapted to receive a rotor end (any of ends 4, 5, 8, or 9 of FIG. 1). In this figure, the segment of FIGS. 2-7 is shown to be the upper segment, while a corresponding and similarly constructed segment is shown as the mating lower segment 83. This lower segment has a body 90, and flange 91 that matches with flange 31. Body 90 carries bolt holes 94 that match with bolt holes 34 of the upper segment so the two segments can be bolted together to form the final seal housing (FIG. 11). Segment 83 has divided (separated) slots 95 and 96 that, like slots 60 and 61, are not in transverse fluid communication within body 90 due to dividing web 97. Segment 83 carries ports (not shown), like ports 37 and 38 of FIG. 4, for access from the interior of the slots to exterior surface 98. Segment 83 carries helical seal members 99, like seal members 46, on its internal surface 100, and has aperture sets 123 and 124 that are similar in arrangement to aperture sets 63 and 64 of the upper segment.

FIG. 8 shows how a divided seal housing made up of two segments according to this invention has in each segment first, second, and third slot arrangements, as described in detail in FIGS. 4-7, for one such segment, together with communicating aperture sets in each segment so that the combined segments form a final seal housing with uniform fluid flow throughout all segments that constitute that housing.

This uniform fluid flow is shown in FIG. 8 wherein arrow 110 represents the flow of a fluid into slot 61 through port 38 (not shown), and removal of such fluid by way of port 37 (not shown) as represented by arrow 111 after all slots and apertures in the upper segment have been filled with such fluid. Similarly, a port (not shown) into slot 100 is represented by arrow 112, and as the flow of fluid into slot 100 progresses, the removal of such fluid from a port (not shown) in slot 114 as represented by arrow 113. Thus, it can be seen that the flow of fluid in both the upper and lower hemispheres of the complete housing of FIG. 8 is uniform.

If the housing of FIG. 8 was to be made up of a monolithic, one-piece housing instead of being made up of a plurality of segments as shown in FIG. 8, there could be one set of opposed grooves and corresponding connecting apertures instead of the pair of opposed grooves and corresponding connecting apertures shown for the pair of segments in FIG. 8.

FIG. 9 shows a section C-C through the housing of FIG. 8, and further shows the lower segment to have an accumulation groove 115 that corresponds to and mates with groove 47, and an exterior surface 98 of its body 90. It further shows that the lower segment has at its end opposing slot 100 a longitudinally extending slot 118 that is similar in extent and contour to slot 71. Slots 100 and 114 (FIG. 8), like slots 61 and 71, have internal ends in body 90. The internal ends 120 and 121 of slots 100 and 118, respectively, are shown in FIG. 9. The internal ends for slots 100 and 114 on the one hand and slot 118 on the other hand are separated by a section 122 of body 117. This section 122 carries aperture sets 123 and 124 that establish fluid communication between slots 100 and 114 on the one hand and slot 118 on the other hand.

FIG. 9 shows one way to seal the slots of the joined segments using an annular ring 130 that fits into notch 41 (FIG. 3) in the upper segment, and a corresponding notch 131 in the lower segment. Ring 130 can be welded or otherwise attached to the housing to form a fluid tight closure for all slots (60, 61, 100, and 114) on that atmosphere end of the final housing. Similarly, annular ring 132 is used to close, and seal in a fluid tight manner, the exposed slots 71 and 118 on the opposing end of the housing. An annular ring is not the only way to seal these slots. For example, a carefully place weld bead can be used to accomplish the same results without filling the slots with weld material.

Figure 10:
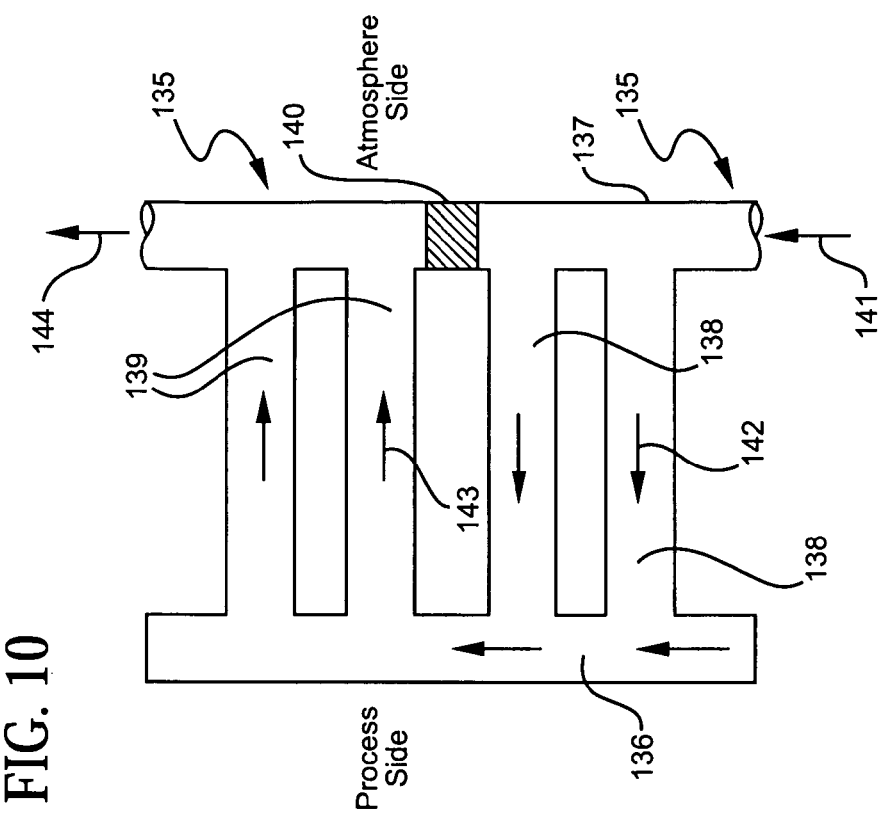
FIG. 10 is a schematic representation of the flow of fluid through the segment of FIG. 1 pursuant to this invention.

FIG. 10 shows the fluid flow described above with respect to each segment of the housing of FIG. 9 using a ladder anomaly. In this figure the fluid flow is represented as a vertical ladder 135 in which fluid flows inside the vertical legs 136 and 137 and horizontal rung sets 138 and 139 of the ladder. Comparing ladder 135 with the vertical segment represented in FIGS. 4 and 7, ladder leg 137 corresponds to slots 60 and 61 of FIG. 4 while ladder leg 136 corresponds to slot 71 of FIG. 7. Leg 137 has a blockage 140 in its interior that corresponds with divider web 62 in FIG. 4 so that fluid introduced into the bottom of leg 137 (by way of port 38 of FIG. 4) passes into the interior of leg 137 (corresponds to slot 61) as shown by arrow 141. When that fluid reaches the lowest of rungs 138 (corresponds to the lowest aperture 64), it passes through that aperture as shown by arrow 142 and starts filling leg 136 (corresponds to slot 71). After leg 137 is filled up to divider 140, additional fluid introduction of fluid causes fluid flow into leg 136 until leg 136 is filled to the lowest of rungs 139 (corresponding to the lowest of apertures 63) at which time fluid starts to flow back to leg 137 above divider 140 as represented by arrow 143. The filling of leg 136 continues to successively higher rungs 139 until leg 136 and leg 137 above blockage 140 (corresponding to slot 60) is filled, after which fluid exits the ladder (corresponding to port 37) as shown by arrow 144. Accordingly, fluid is evenly distributed throughout the ladder (seal housing) for optimal fluid flow and uniform heat extraction if the fluid is a coolant. As can be seen from the above, cooling a seal housing with this invention can be achieved by access to that housing (ports 37 and 38) only on the atmosphere side thereof, a significant advantage.

It can be seen from FIG. 10 that the distance of travel for the cooling fluid within ladder 135 is essentially the same regardless of the path taken. This produces the exceptionally uniform heat extraction from and uniform heat distribution around the final housing which in turn leads to an exceptionally smooth temperature gradient from the hotter process end to the cooler atmosphere end of the final housing.

FIG. 11 shows an isometric view of the assemblage of FIGS. 8 and 9, and in particular shows the relationship of the driven rotor sleeve 160, as aforesaid, to the interior 80 of the final housing of FIG. 8. More particularly, FIG. 11 shows an exploded isometric view of lower seal 10 as it fits over end projection 150 of rotor end 8. Projection 150 carries an elongate key 151 that mates with a keyway 152 carried on the interior surface of annular, split sleeve 153, flange 154 abutting the outer end 155 of rotor end 8. Thus, sleeve 153 is fixed to rotating end 8, and, itself, rotates within body 30 adjacent to the interior lands 51 (FIGS. 5 and 6) of grooves 47. Annular ring 132 closes slot 71, while annular ring 130 closes slot 61 (not shown), both in a fluid tight manner. Aperture 156 is a thermocouple port. Apertures 157 are jack bolt holes for jacking flange 31 away from plate 18 when removing seal 10 from machine 1. Larger diameter apertures 158 are bolt holes for fixing seal 10 to plate 18 so seal 10 can provide its sealing function during operation of machine 1 when rotor 8 is rotating.

Bolts 160 are clamping means for joining together two mating seal halves (segments) to form the final seal 10 housing that surrounds rotating sleeve 153. Bolts 161 are clamping screws for fixing the opposing ends 162 and 163 of split sleeve 153 into abutment with one another in a sealing fashion to form a single piece, annular sleeve member that extends around the entire periphery of projection 150. Tubing fittings 165 are employed in fluid communication with slots 60 and 61 (FIG. 8) for circulating cooling fluid through seal 10 in the manner shown in FIG. 10.

What is claimed is:

1. A seal housing comprising a body (30) having a longitudinal axis and a transverse axis, said body having a bore there through along said longitudinal axis thereby defining longitudinally extending interior and exterior surfaces of said housing, said body and said interior and exterior surfaces terminating at first and second opposed transversely contoured ends (43,44), said first end of said body (44) having a first transverse slot (71), said second end of said body (43) having second and third spaced apart transverse slots (60,61), said second and third slots being physically separated from one another in said body, said first slot and said second and third slots terminating in said body at opposed internal ends (70,72) thereby leaving a body section (73) between said internal end of said first slot and said opposing internal ends of said second and third slots, at least one of said interior and exterior surfaces carries at least one seal member (46), said first transverse slot extends longitudinally into said body and transversely of said body along said transverse contour of said first end, said second and third transverse slots extend longitudinally into said body and transversely of said body along said transverse contour of said second end, said second and third slots are not in fluid communication with one another in a transverse manner, a first set of a plurality of said apertures (63) establishes first fluid communication between said first slot and said second slot and a second set of a plurality of different apertures (64) establishes second fluid communication between said first slot and said third slot which second fluid communication is independent of said first fluid communication, and said body has at least one port (37) between the exterior surface and said second slot (60) and at least one port (38) between the exterior surface and said third slot (61), whereby fluid entering said body by way of one of said first and second ports passes through one set of said apertures into said first groove and from said first groove back through the other set of said apertures to reach an exit port.

2. The housing of claim 1 wherein said first transverse slot extends over a major portion of said first transversely contoured end, said second transverse slot extends over a minor portion of one end of said second transversely contoured end, and said third transverse slot extends over a major portion of the remainder of said second transversely contoured end that is not covered by said second transverse slot.

3. The housing of claim 1 wherein said first transverse slot extends over essentially all of said contour of said first end, said third transverse slot extends over essentially all of said remaining contour of said second transversely contoured end that is not covered by said second slot.

4. The housing of claim 1 wherein said spaced apart apertures are provided in first and second groups each such group containing a plurality of said apertures, said first group of apertures extending solely between said second transverse slot and an opposing section of said first transverse slot, and said second group of apertures extending solely between said third transverse slot and an opposing section of said first slot.

5. The housing of claim 3 wherein said apertures extend essentially along said longitudinal axis and are essentially parallel with one another, and said second group of apertures comprises a majority of the total of apertures in said first and second groups of apertures, whereby fluid introduced into said housing by way of said port in said third transverse slot fills said third transverse slot, as said fluid reaches an aperture communicating with said third transverse slot it passes from said slot through said aperture into said first transverse slot until said fluid fills same, as said fluid reaches an aperture communicating with said second transverse slot it passes through said aperture into said second transverse slot, and after filling said second transverse slot said fluid passes out of said housing by way of said port in said second transverse slot.

6. The housing of claim 5 wherein said port in said third transverse slot is located near the end of said third transverse slot that is furthest from said second transverse slot, and said port in said second transverse slot is located near the end of said second transverse slot that is furthest from said port in said third transverse slot.

7. The housing of claim 1 wherein said interior surface of said body carries around its circumference a transversely extending groove (47), said groove being disposed intermediate said first and second opposed transversely contoured ends, and said body carries at least one port (36) between said exterior of said body and said groove.

8. The housing of claim 1 wherein said seal housing is segmented and each said segment of said housing contains said first, second, and third transverse slots together with communicating apertures so that when said segments are joined together they form a final seal housing having multiple sets of first, second, and third transverse slots with accompanying apertures.

9. The housing of claim 1 wherein said seal member is composed of a plurality of helical grooves (46), each such groove being arcuate in its transverse cross-section.

\* \* \* \* \*